US009164337B1

(12) United States Patent
Chen

(10) Patent No.: US 9,164,337 B1
(45) Date of Patent: Oct. 20, 2015

(54) MANUFACTURING METHOD OF DISPLAY PANEL AND REPAIR LINE STRUCTURE THEREOF

(75) Inventor: Cheng-hung Chen, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 376 days.

(21) Appl. No.: 13/521,679

(22) PCT Filed: Jun. 1, 2012

(86) PCT No.: PCT/CN2012/076372
§ 371 (c)(1),
(2), (4) Date: Jul. 11, 2012

(87) PCT Pub. No.: WO2013/177789
PCT Pub. Date: Dec. 5, 2013

(51) Int. Cl.
*G02F 1/1362* (2006.01)

(52) U.S. Cl.
CPC ............... *G02F 1/136259* (2013.01); *G02F 2001/136263* (2013.01)

(58) Field of Classification Search
None
See application file for complete search history.

(56) References Cited

U.S. PATENT DOCUMENTS

| 2007/0002204 A1* | 1/2007 | Kim et al. ............... 349/54 |
| 2009/0021665 A1* | 1/2009 | Shiao et al. ............. 349/54 |
| 2009/0033823 A1* | 2/2009 | Chung et al. ............ 349/54 |

* cited by examiner

*Primary Examiner* — Richard Kim
(74) *Attorney, Agent, or Firm* — Andrew C. Cheng

(57) ABSTRACT

A manufacturing method and repair structure of a display panel are provided. A repair method for a signal wire of the display panel comprises the steps of: connecting a repair wire and a welding pad before a PSVA process, and connecting the repair wire to a short-circuit bus bar of a signal wire of the same category through the welding pad; and welding a weld point between a breakpoint and the connection point of the repair wire and the short-circuit bus bar on a broken wire, hence a signal applied to the display panel by the short-circuit bus bar is transmitted to the breakpoint through the repair wire in the PSVA process. Since the repair wire is connected with the short-circuit bus bar and directly powered up through the short-circuit bus bar in the PSVA process, the wire can not be broken when the signal is transmitted via the short-circuit bus bar, the permanent memory of the broken wire defect of the display panel in the form of a liquid crystal pre-tilt angle on the display panel during the PSVA process can be avoided, and the process yield of the display panel can be increased.

15 Claims, 5 Drawing Sheets

MANUFACTURING METHOD OF DISPLAY PANEL AND REPAIR LINE STRUCTURE THEREOF

BACKGROUND OF THE INVENTION

1. Field of the Invention

The present invention relates to the field of a liquid crystal displaying techniques, and in particular to an manufacturing method of a display panel and a repair line structure.

2. The Related Arts

A liquid crystal display panel includes a array substrate, a color filter substrate, disposed oppositely to an array substrate, and a liquid crystal layer sandwiched between two substrates, wherein the array substrate is disposed with a large amount of signal lines, such as, scan lines and data lines. During the manufacturing process, some defects may occur to the large amount of signal lines, for example, broken lines. Pixel electrodes on the broken lines will not receive the normal data signals, leading to defects in the liquid crystal panel.

Specifically, for the liquid crystal panel using a PSVA display mode, because the signal lines are broken before a PSVA process, the defects of the broken lines of the display panel will be permanently imprinted to the display panel in a manner of the liquid crystal pre-tilt angle after the subsequent PSVA process using pre-heating or UV radiation for curing pre-tilt angle. Any subsequent repair will be rendered useless.

In summary, it is desired to have a manufacturing method of a display panel and a repair line structure thereof.

SUMMARY OF THE INVENTION

The technical issue to be addressed by the present invention is to provide a manufacturing method of a display panel and a repair line structure thereof, to prevent broken line defects of the display panel from permanently imprinted on the display panel in a manner of the liquid crystal pre-tilt angle and to improve the display panel yield rate.

The present invention provides the manufacturing method of the display panel. The panel comprises a plurality of repair lines for repairing signal lines with the broken line defect existing in the panel. The manufacturing method comprises: before a PSVA process, connecting one of the repair lines to a solder pad, and connecting one of the repair lines through the solder pad to a short circuit bus of the same type of a signal line, path of the repair lines connecting to the short-circuit bus passing a panel cutting line; welding a weld point located between a broken point on the broken line and a connection point of the repair line and the short-circuit bus so that signal applied through the short-circuit bus to the display panel passing the repair line to the broken point; and after the PSVA process, cutting along the panel cutting line to cut off the connection between the repair lines and the short-circuit bus.

According to a preferred embodiment of the present invention, the short-circuit bus is located on one side of the panel cutting line, while the solder pad, the signal line and the repair line are located on the other side of the panel cutting line.

According to a preferred embodiment of the present invention, the same type of signal lines are scan lines are data lines.

The present invention provides a manufacturing method of a display panel. The panel comprises a plurality of repair lines for repairing signal lines with a broken line defect existing in the panel. The manufacturing method comprises: before a PSVA process, connecting one of the repair lines to the solder pad, and connecting one of the repair lines through a solder pad to a short circuit bus of the same type of the signal line; and welding the weld point located between a broken point on the broken line and a connection point of the repair line and the short-circuit bus so that the signal applied through the short-circuit bus to the display panel passing the repair line to the broken point.

According to a preferred embodiment of the present invention, the short-circuit bus is located on one side of the panel cutting line, while the solder pad, the signal line and the repair line are located on the other side of the panel cutting line.

According to a preferred embodiment of the present invention, the short-circuit bus is connected to a test pad of the display panel and a PSVA pad of the PSVA process; the short-circuit bus, the test pad and the PSVA pad are located on same side of the panel cutting line.

According to a preferred embodiment of the present invention, the method further includes a step of: after the PSVA process, cutting off the connection between the repair lines and the short-circuit bus.

According to a preferred embodiment of the present invention, path of the repair lines connecting to the short-circuit bus passes the panel cutting line, and cutting along the panel cutting line will cut off the connection between the repair lines and the short-circuit bus.

According to a preferred embodiment of the present invention, a switch is further disposed between each of the repair lines and the short-circuit bus; during line PSVA process, the switch is closed to realize the connection between the repair line and the short-circuit bus; after the PSVA process, the switch is cut off to cut off the connection between the repair lines and the line short-circuit bus.

According to a preferred embodiment of the present invention, a switch is disposed on a side of the panel cutting line closer to the short-circuit bus.

According to a preferred embodiment of the present invention, a switch is disposed on a side of the panel cutting line closer to the solder pad.

According to a preferred embodiment of the present invention, the same type of the signal lines are scan lines are data lines.

The present invention provides a repair line structure of a display panel, which comprises: a short-circuit bus, located on one side of a panel cutting line; a solder pad, a plurality of signal lines and a plurality of repair lines, located on the other side of a panel cutting line; wherein the plurality of signal lines being connected to the solder pad, and connected to the short-circuit bus through the solder pad; each of the repair lines insulatedly crossing the plurality of signal lines and forming welding points at crossing points.

According to a preferred embodiment of the present invention, one of the repair lines is connected to the solder pad and connected to the short-circuit bus of the same type of the signal lines through the solder pad.

According to a preferred embodiment of the present invention, the short-circuit bus is connected to a test pad of the display panel and a PSVA pad of the PSVA process; the short-circuit bus, the test pad and the PSVA pad are located on the same side of the panel cutting line.

According to a preferred embodiment of the present invention, after the PSVA process, the connection between the repair lines and the short-circuit bus is cut off.

According to a preferred embodiment of the present invention, a switch is further disposed between each of repair lines and the short-circuit bus; during the PSVA process, the switch is closed to realize the connection between the repair line and short-circuit bus; after the PSVA process, the switch is cut off to cut off the connection between the repair line and the short-circuit bus.

According to a preferred embodiment of the present invention, a switch is disposed on a side of the panel cutting line closer to the short-circuit bus.

According to a preferred embodiment of the present invention, a switch is disposed on a side of the panel cutting line closer to the solder pad.

According to a preferred embodiment of the present invention, the same type of the signal lines are scan lines are data lines.

The efficacy of the present invention is that to be distinguished from the state of the art. The present invention connects the repair lines to the short-circuit bus, and during the PSVA process, supplies electricity directly through the short-circuit bus to the repair lines to realize that no broken line will be generated when using the short-circuit bus to supply signal and to prevent the broken line defects of the display panel from permanently imprinted on the display panel in a manner of the liquid crystal pre-tilt angle and to improve the display panel yield rate.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following description refers to drawings and embodiment of the present invention.

Figure 1:
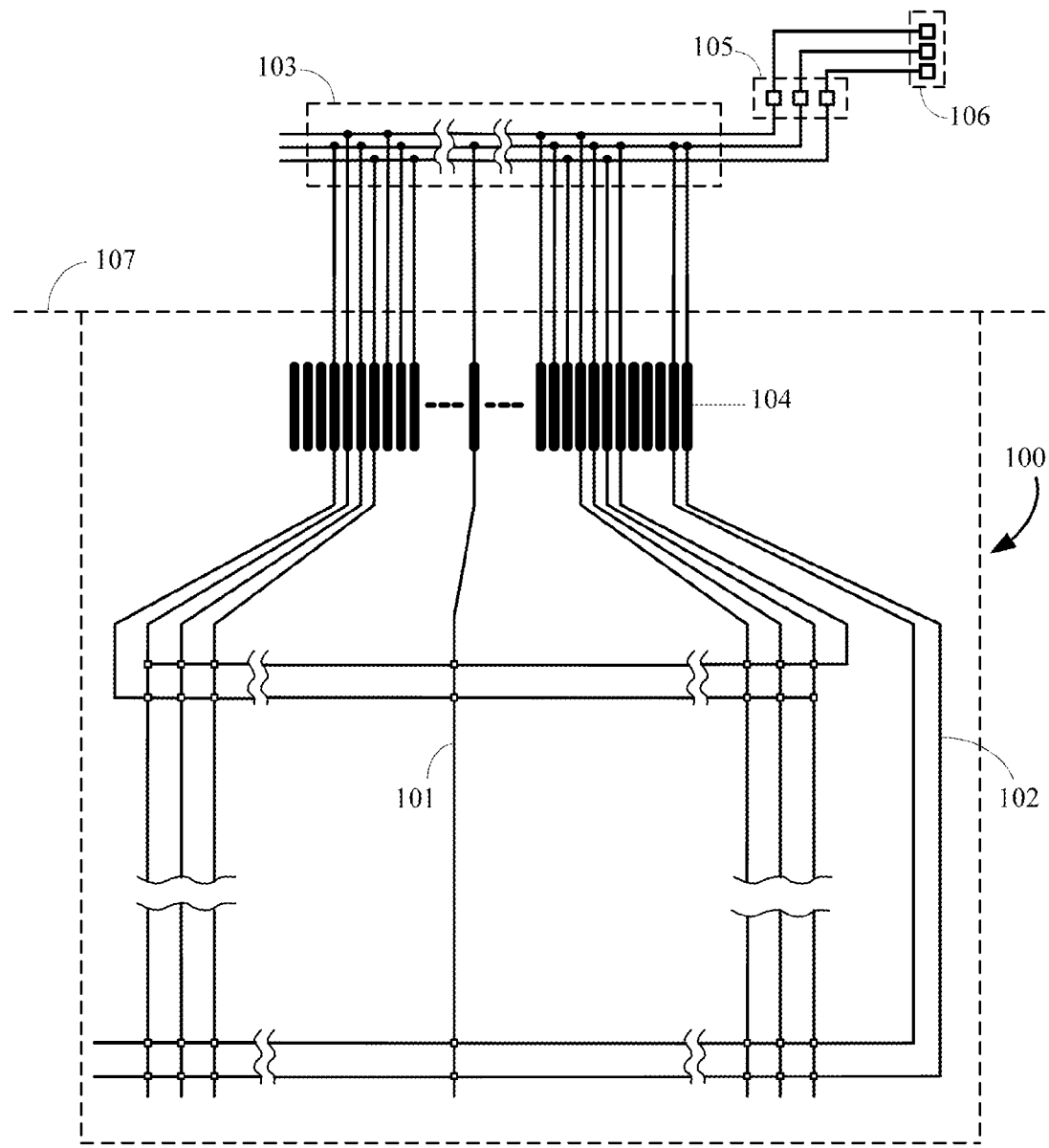
FIG. 1 is a schematic view showing the structure of a first embodiment of repair line structure of display panel according to the present invention.

FIG. 1 is a schematic view showing the structure of a first embodiment of a repair line structure of a display panel according to the present invention. As shown in FIG. 1, the repair line structure of the display panel 100 includes: a plurality of signal lines 101, a plurality of repair lines 102, a short-circuit bus 103, a solder pad 104, a test pad 105 and a PSVA pad 106.

In the instant embodiment, the signal lines 101 generally refer to drive lines of the display panel 100, such as, scan lines or data lines.

In the instant embodiment, a short-circuit bus 103, a test pad 105 and a PSVA pad 106 are located on one side of a panel cutting line 107, while the plurality of signal lines 101, the plurality of repair lines 102 and the solder pad 104 are located on the other side of the panel cutting line 107.

The plurality of signal lines 101 are connected to the solder pad 104 respectively, and connected to the short-circuit bus 103 through the solder pad 104. Specifically, when signal lines 101 are the scan lines, a plurality of scan lines is connected through the solder pad 104 to the corresponding short-circuit bus 103; when the signal lines 101 are the data lines, a the plurality of data lines is connected through the solder pad 104 to the corresponding short-circuit bus 103.

The repair lines 102 are for repairing the signal lines 101 with a broken line defect in the display panel 100. Each of repair lines 102 insulatedly crosses the plurality of signal lines 101 and forms welding points at crossing points.

In the present invention, the repair lines 102 are further connected through the solder pad 104 to the short-circuit bus 103 of the same type, and path of the repair line 102 connected to the short-circuit bus 103 through the solder pad 104 passes the panel cutting line 107.

Specifically, when the signal lines 101 are scan lines, the repair line 102 is connected through the solder pad 104 to the corresponding short-circuit bus 103 of the scan line; when the signal lines 101 are data lines, the repair line 102 is connected through the solder pad 104 to the corresponding short-circuit bus 103 of the data line.

The test pad 105 is for testing signals during the cell process or the array process. The PSVA pad 106 is for applying a voltage during the PSVA process. Both the short-circuit bus 103 and the test pad 105 are connected to the PSVA pad.

Figure 2:
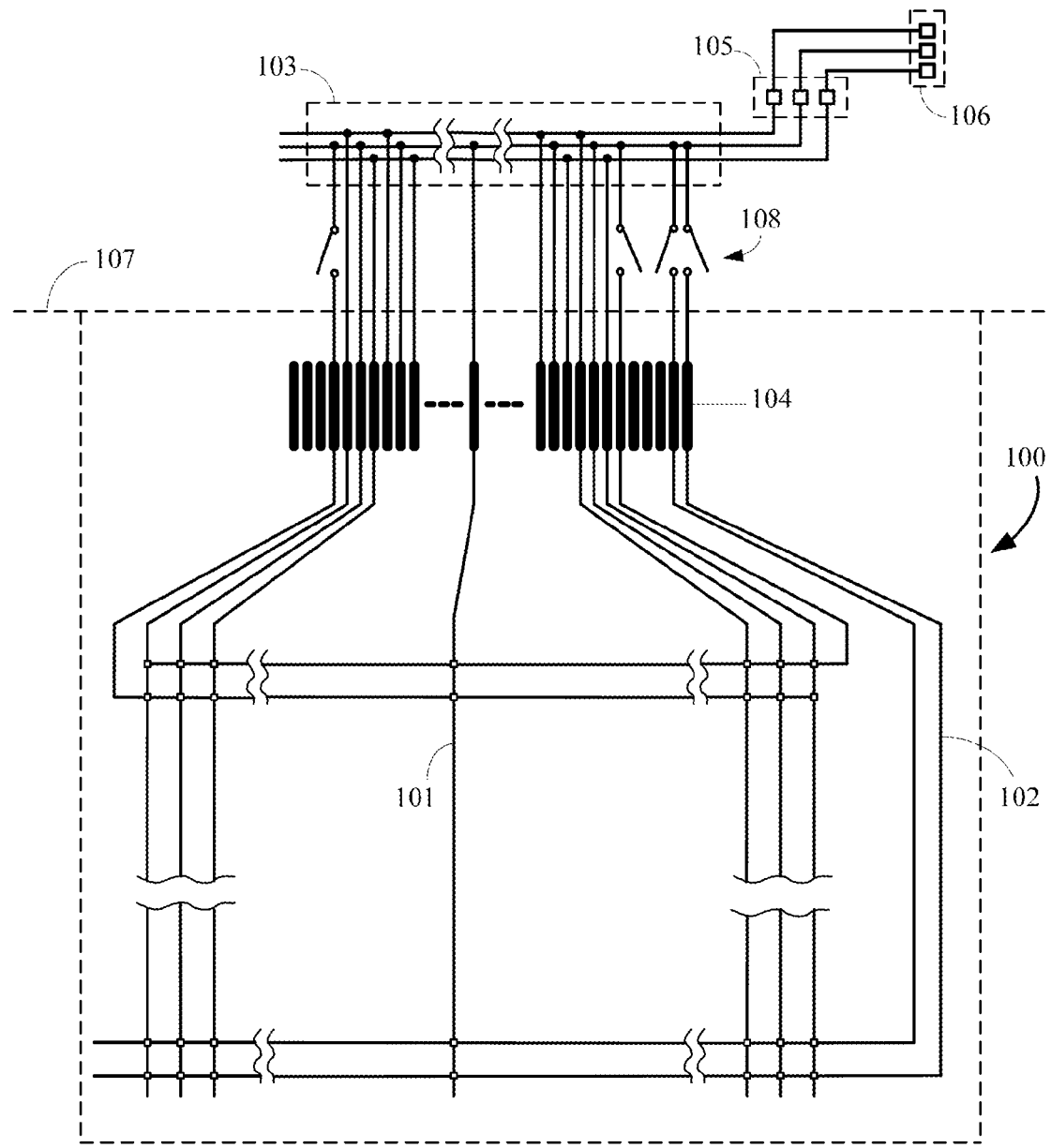
FIG. 2 is a schematic view showing the structure of a second embodiment of repair line structure of display panel according to the present invention.

FIG. 2 is a schematic view showing the structure of a second embodiment of a repair line structure of a display panel according to the present invention.

The present embodiment is based on the embodiment in FIG. 1. a switch 108 is further disposed between the repair line 102 and the short-circuit bus 103 for connecting or cutting off between the repair line 102 and the short-circuit bus 103 through the close and cut-off of the switch 108, wherein the switch 108 can be disposed on a side of the panel cutting line 107 close to the short-circuit bus 103, or on a side of the panel cutting line 107 close to the solder pad 104.

Figure 3:
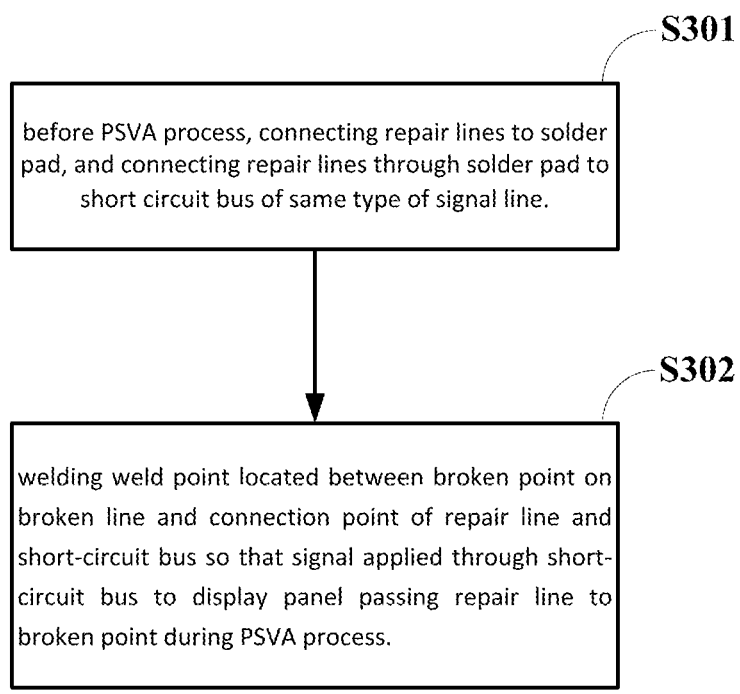
FIG. 3 is a flowchart of a first embodiment of manufacturing method of display panel according to the present invention.

FIG. 3 is a flowchart of a first embodiment of a manufacturing method of a display panel according to the present invention, for manufacturing the display panel 100 with a repair line structure of FIG. 1.

As shown in FIG. 3, the manufacturing method of a display panel includes the steps of:

Step S301: before a PSVA process, connecting one of repair lines to a solder pad, and connecting the repair line through the solder pad to the short circuit bus of the same type of the signal line.

Step S302: welding a weld point located between a broken point on a broken line and a connection point of the repair line and the short-circuit bus so that the signal applied through the short-circuit bus to display panel passing the repair line to the broken point during the PSVA process.

The following refers to both FIG. 1 and FIG. 3 to describe the manufacturing method of the display panel of the present invention in details.

Specifically, the manufacturing method of display panel of the present invention can be divided into three stages: the pre-PSVA process, the PSVA process and the post-PSVA process.

In the instant embodiment, the pre-PSVA process comprises the following steps: first, through an array process, providing an active array substrate and a color filter substrate, respectively; during a cell process, forming polyimide (PI) on the active array substrate and the color filter substrate, respectively; through one drop filling (ODF) process, filling liquid crystal molecules between the active array substrate and the color filter substrate; and through an edge cut process, exposing the test pad 105 (as shown in FIG. 1) on the edges of the two substrates and the PSVA pad 106 (as shown in FIG. 1) used in the subsequent PSVA process, for the subsequent application of the alignment voltage through the PSVA pad 106 to the display panel 100.

In the present invention, step S301 of connecting the repair lines 102 to the solder pad 104, and connecting the repair lines 102 through the solder pad 104 to the short circuit bus 103 of the same type of the signal line, and step S302 of welding the weld point located between the broken point on the broken line and the connection point of the repair line 102 and the short-circuit bus 1103 can both be completed during the array process or before applying the PSVA alignment voltage in the cell process.

During the PSVA process, an alignment voltage is first applied to the display panel 100 through the PSVA pad 106 to tilt the liquid crystal molecules.

Figure 4:
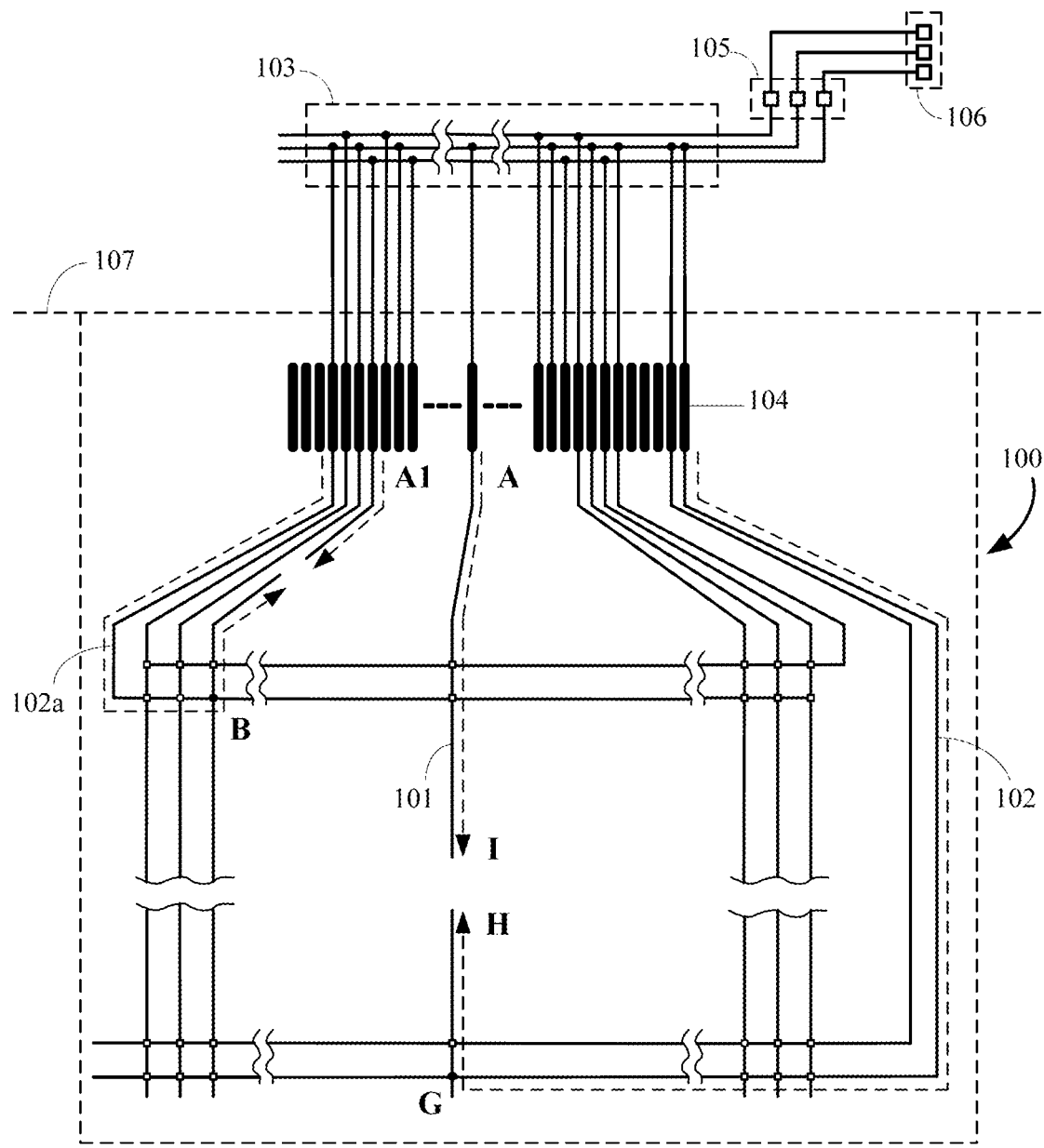
FIG. 4 is a schematic view showing signal propagation at broken point on display panel during PSVA process in the manufacturing method according to the present invention.

Then, referring to FIG. 4, FIG. 4 is a schematic view showing the signal propagation at the broken point on the display panel during the PSVA process in the manufacturing method according to the present invention.

As shown in FIG. 4, broken points I and H are used for exemplary description. The operating theory behind the repair line structure of the display panel according to the present invention is as follows.

Before the PSVA process (i.e., before applying UV1 process), repair is performed on the signal line 101 having the broken line defect. Laser beam is focused onto the weld point G located between the broken point and the connection point of the repair line 102 and the short-circuit bus 103 so that the signal line 101 and the repair line 102 realize effective conduction.

Then, through applying the voltage on the PSVA pad 106 to the display panel 100, the signal passing the short-circuit bus 103 has a part propagating through A to I, and another part propagating through the repair line 102 to weld the point G, and then to broken the point H to finish signal propagation. As seen, in the present invention, the signal applied through the short-circuit bus 103 to the display panel 100 can pass through the repair line 102 and propagate to the broken point. In other words, in the PSVA process, the signal supplied from the short-circuit bus 103 to the display panel 100 will not generate the broken line. Therefore, in the subsequent UV1 process with heating or UV radiation on the display panel 100, defects of the broken line will not be imprinted permanently in a manner of the pre-tilt angle in the display panel 100.

Similarly, when the breakage occurs between A and I and requires repair, laser beam is focused onto the weld point B so that the signal line 101 and the repair line 102a realize effective conduction before the PSVA process. At this point, a part of the alignment signal propagates through A1 to the broken point, and another part of the alignment signal propagates through the test pad 105 and the PSVA pad 106, and then applied by the short-circuit bus 103 to the repair line 102a to the broken point to accomplish the signal propagation.

As such, in the PSVA process, after applying the alignment voltage, heating or UV radiation is applied to the display panel 100 to facilitate monomers in the liquid crystal molecules to polymerize to form the pre-tilt angle (UV1 process). After the UV1 process, alignment of the liquid crystal molecules is checked (AOI process), and remaining the monomers are reacted without applying the alignment voltage (UV2 process).

After the PSVA process, macro inspection, chip cut, POL and inspection steps are executed.

Figure 5:
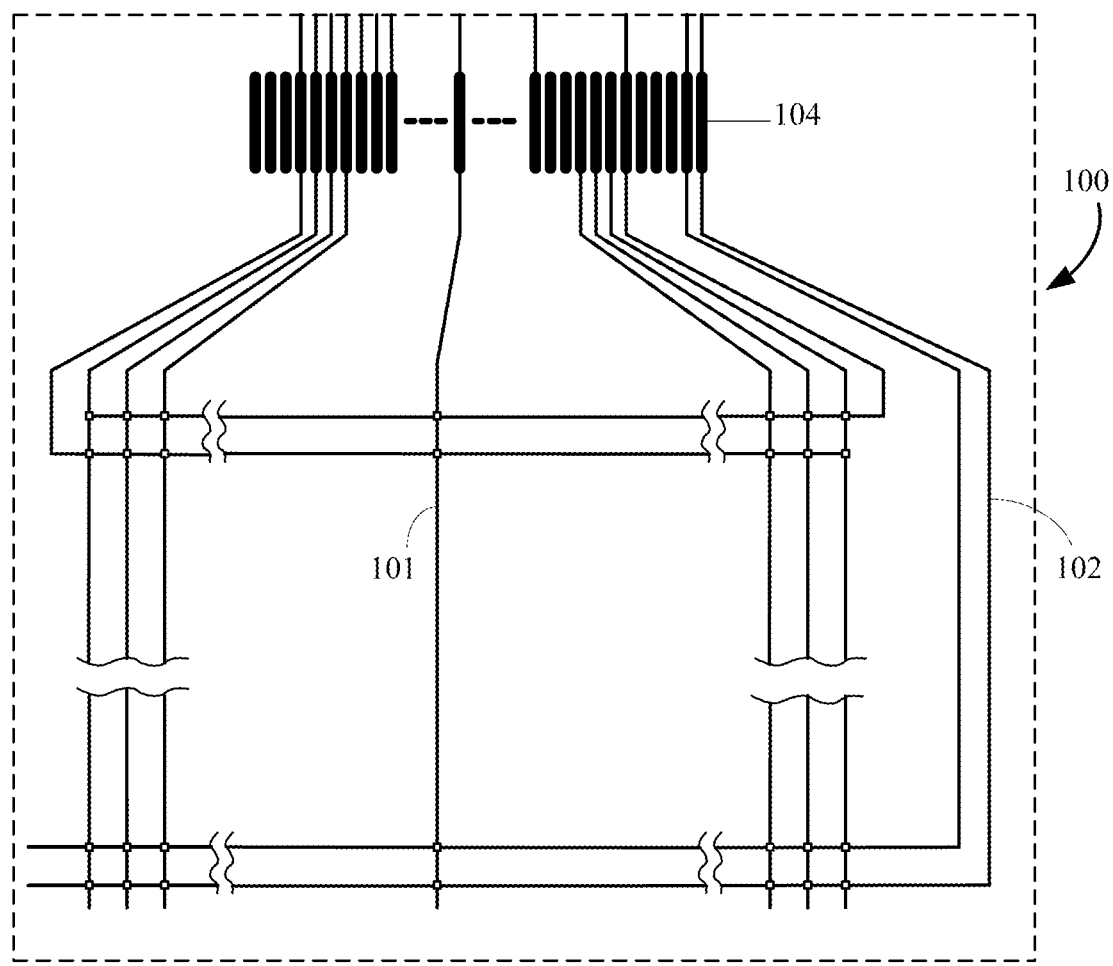
FIG. 5 is a schematic view showing the structure of display panel manufactured according to manufacturing method of the present invention.

In the instant embodiment, after the macro inspection and during chip cut step, cutting is performed the long panel cutting line 107 so as to cut a large substrate into a plurality of the same-sized display panels 100 as shown in FIG. 5. At the same time, with the chip cut step, the connection between repair lines 102 and the short-circuit bus 103 is cut off to prevent the display panel 100 from connecting to the short-circuit bus 103 during the normal operation.

Attaching a polarizer film to the display panel 100 of FIG. 5 and then performing inspection, if some defect occurs, such as, weak line or abnormal display in display panel 100, corresponding repair can be performed to repair the panel.

It should be understood that the manufacturing method of the display panel 100 using the repair line structure shown in FIG. 2 is similar to the manufacturing method of the display panel 100 using the repair line structure shown in FIG. 1, except further including the following steps: before the PSVA process, closing the switch 108 to realize the connection between the repair line 102 and the short-circuit bus 103; and after the PSVA process, cutting off the switch 108, cutting along the panel cutting line to cut off connection between the repair lines 102 and the short-circuit bus 103 to prevent the display panel 100 from connecting to the short-circuit bus 103 during the normal operation.

In summary, the present invention connects the repair lines to the short-circuit bus, and during PSVA process, supplies electricity directly through the short-circuit bus to the repair lines to realize that no broken line will be generated when using the short-circuit bus to supply signal and to prevent the broken line defects of the display panel from permanently imprinted on the display panel in a manner of the liquid crystal pre-tilt angle and to improve the display panel yield rate.

Furthermore, in the embodiment of the present invention, after the PSVA process, the connection between the repair lines and the short-circuit bus is cut off to prevent the display panel from connecting to the short-circuit bus during normal operation. Hence, no negative effect on the normal operation of the display panel will be caused.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A manufacturing method of a display panel, applicable to a panel comprising a plurality of repair lines, for repairing signal lines with a broken line defect existing in the panel, the manufacturing method comprises:
   before a PSVA process, connecting one of the repair lines to a solder pad, and connecting the repair line through the solder pad to a short circuit bus of same type of the signal line, path of the repair lines connecting to the short-circuit bus passing a panel cutting line;
   welding a weld point located between a broken point on the broken line and a connection point of the repair line and the short-circuit bus so that signal applied through the short-circuit bus to display the panel passing the repair line to the broken point; and
   after the PSVA process, cutting along the panel cutting line to cut off connection between the repair lines and the short-circuit bus;

wherein the short-circuit bus being located on one side of the panel cutting line, while the solder pad, the signal line and the repair line being located on other side of the panel cutting line.

2. The manufacturing method as claimed in claim 1, characterized in that the same type of the signal line is scan line or data line.

3. A manufacturing method of a display panel, applicable to a panel comprising a plurality of repair lines, for repairing signal lines with a broken line defect existing in the panel, the manufacturing method comprises:

before a PSVA process, connecting one of the repair lines to a solder pad, and connecting the repair line through the solder pad to a short circuit bus of same type of the signal line; and welding a weld point located between a broken point on the broken line and a connection point of the repair line and the short-circuit bus so that signal applied through the short-circuit bus to the display panel passing the repair line to the broken point; wherein a switch is further disposed between each of the repair line and the short-circuit bus; during the PSVA process, the switch is closed to realize the connection between the repair line and the short-circuit bus; after the PSVA process, the switch is open to cut off connection between the repair lines and the short-circuit bus.

4. The manufacturing method as claimed in claim 3, characterized in that the short-circuit bus is located on one side of panel cutting line, while the solder pad, the signal line and the repair line are located on another side of the panel cutting line.

5. The manufacturing method as claimed in claim 4, characterized in that the short-circuit bus is connected to test pads of display panel and PSVA pads of the PSVA process; the short-circuit bus, the test pads and the PSVA pads are located on same side of the panel cutting line.

6. The manufacturing method as claimed in claim 3, wherein the manufacturing method further comprises a step of: after the PSVA process, cutting off connection between the repair line and the short-circuit bus.

7. The manufacturing method as claimed in claim 6, characterized in that the path of the repair lines connecting to the short-circuit bus passes the panel cutting line, and the connection between the repair lines and the short-circuit burs are cut off when cutting along the panel cutting line.

8. The manufacturing method as claimed in claim 3, characterized in that the switch is disposed on a side of the panel cutting line closer to the short-circuit bus.

9. The manufacturing method as claimed in claim 3, characterized in that the switch is disposed on a side of the panel cutting line closer to the solder pad.

10. The manufacturing method as claimed in claim 3, characterized in that the same type of the signal lines are scan lines or data lines.

11. A repair line structure of a display panel, which comprises:

a short-circuit bus, located on one side of a panel cutting line; and solder pads, a plurality of signal lines and a plurality of repair lines, located on the other side of the panel cutting line; wherein the plurality of signal lines being connected to the solder pads, and connected to the short-circuit bus through the solder pads; each of the repair line insulatedly crossing the plurality of signal lines and forming welding points at crossing points, characterized in that:

a repair line being connected to one of the solder pads and connected to the short-circuit bus of same type of the signal lines through the solder pad before a PSVA process;

the short-circuit bus is connected to test pads of the display panel and PSVA pads of the PSVA process; the short-circuit bus, the test pads and the PSVA pads are located on same side of a panel cutting line; and after the PSVA process, connection between the repair lines and the short-circuit bus is cut off.

12. The repair line structure as claimed in claim 11, characterized in that a switch is further disposed between each repair line and short-circuit bus; during the PSVA process, the switch is closed to realize the connection between repair line and short-circuit bus; after the PSVA process, the switch is open to cut off connection between the repair line and the short-circuit bus.

13. The repair line structure as claimed in claim 12, characterized in that the switch is disposed on a side of the panel cutting line closer to the short-circuit bus.

14. The repair line structure as claimed in claim 12, characterized in that switch is disposed on a side of the panel cutting line closer to the solder pad.

15. The repair line structure as claimed in claim 11, characterized in that the same type of signal lines are scan lines or data lines.

* * * * *